(12) United States Patent
Stork

(10) Patent No.: US 6,879,967 B1
(45) Date of Patent: Apr. 12, 2005

(54) METHOD AND APPARATUS FOR OPEN DATA COLLECTION

(75) Inventor: David G. Stork, Portola Valley, CA (US)

(73) Assignee: Ricoh Co., Ltd., Tokyo (JP)

(*) Notice: Subject to any disclaimer, the term of this patent is extended or adjusted under 35 U.S.C. 154(b) by 0 days.

(21) Appl. No.: 09/534,950

(22) Filed: Mar. 24, 2000

(51) Int. Cl.$^7$ .............................................. G06N 5/00
(52) U.S. Cl. ............................................. 706/12; 706/45
(58) Field of Search .......................... 706/10, 12, 45, 706/50, 16; 707/6, 1

(56) References Cited

U.S. PATENT DOCUMENTS

| | | | | |
|---|---|---|---|---|
| 5,586,218 A | * | 12/1996 | Allen | 706/10 |
| 5,671,333 A | * | 9/1997 | Catlett et al. | 706/12 |
| 5,675,710 A | * | 10/1997 | Lewis | 706/12 |
| 5,802,509 A | * | 9/1998 | Maeda et al. | 706/59 |
| 5,806,056 A | * | 9/1998 | Hekmatpour | 706/50 |
| 5,819,247 A | * | 10/1998 | Freund et al. | 706/25 |
| 5,901,246 A | * | 5/1999 | Hoffberg et al. | 382/209 |
| 5,946,673 A | * | 8/1999 | Francone et al. | 706/13 |
| 5,960,422 A | * | 9/1999 | Prasad | 706/47 |
| 5,963,940 A | * | 10/1999 | Liddy et al. | 707/5 |
| 5,970,482 A | * | 10/1999 | Pham et al. | 706/16 |
| 5,974,412 A | * | 10/1999 | Hazlehurst et al. | 707/10 |
| 6,026,388 A | * | 2/2000 | Liddy et al. | 707/1 |
| 6,112,176 A | * | 8/2000 | Goldenthal et al. | 704/231 |
| 6,128,380 A | * | 10/2000 | Shaffer et al. | 379/265.01 |
| 6,128,608 A | * | 10/2000 | Barnhill | 706/16 |
| 6,144,989 A | * | 11/2000 | Hodjat et al. | 706/10 |
| 6,269,368 B1 | * | 7/2001 | Diamond | 707/6 |
| 6,289,353 B1 | * | 9/2001 | Hazlehurst et al. | 707/102 |
| 6,411,932 B1 | * | 6/2002 | Molnar et al. | 704/254 |
| 6,427,141 B1 | * | 7/2002 | Barnhill | 706/16 |
| 6,493,686 B1 | * | 12/2002 | Francone et al. | 706/12 |
| 2003/0023571 A1 | * | 1/2003 | Barnhill | 706/16 |

OTHER PUBLICATIONS

Niederman et al., Trends in End–User Training: A Research Agenda, Jun. 1998, Proceedings of the 1998 Conference on Computer Personnel Research, pp. 224–232.*

Marold et al., Usability Testing for a Computer Skills WBT (Web Based Training) Program, Apr. 1999, Proceedings of the 1999 ACM SIGCPR, pp. 304–309.*

Billsus et al., A Personal News Agent That Talks, Learns and Explains, May 1999, Proceedings of the 3rd Annual Conference on Autonomous Agents, pp. 268–275.*

Chen et al., WebMate: A Personal Agent for Browsing and Searching, May 1998, Proceedings of the 2nd International Conference on Autonomous Agents, pp. 132–139.*

Bose et al., Application of Intelligent Agent Technology for Managerial Data Analysis and Mining, Winter 1999, ACM SIGMIS Database, vol. 30, Iss 1, pp. 77–94.*

Stork et al., Speechreading: An Overview of Image Processing, Feature Extraction, Sensory Integration and Pattern Recognitio Techniques, Proceedings of the 2nd International Conference on Automatic Face and Gesture Recognition, Oct. 1996.*

Beers et al., "An Intelligent Hierarchical Decision Architecture for Operational Test and Evaluation", Proceedings of the 5th IEE International Conference on Fuzzy Systems, Sep. 1996, vol. 1, pp. 342–348.*

* cited by examiner

Primary Examiner—Wilbert L. Starks, Jr.
(74) Attorney, Agent, or Firm—Blakely, Sokoloff, Taylor & Zafman LLP

(57) ABSTRACT

A method and apparatus for open data collection is provided. The method of machine learning comprises setting up a system for learning, the system having certain goals. The method further comprising presenting queries to non-expert netizens over a network, the netizens participating in the training process. Then, based on responses to the queries, the method continually updating the system and refining the queries.

21 Claims, 13 Drawing Sheets

| Question 1 | | | Question 2 | | | ... | Question n | | |
|---|---|---|---|---|---|---|---|---|---|
| ResponderA | RatingA | Response1 | ResponderF | RatingF | Response1 | ... | | | |
| ResponderB | RatingB | Response2 | ResponderN | RatingN | Response2 <current> | ... | | | |
| ⋮ | ⋮ | | | | | | | | |
| ResponderL | RatingL | Response(m) | | | | | | | |
| # of Responders | Confidence Rating | Aggreg. Responses | # of Responders | Confidence Rating | Aggreg. Responses | ... | # of Responders | Confidence Rating | Aggreg. Responses |
| Y | Z | X | | | | | | | |

FIG. 4

METHOD AND APPARATUS FOR OPEN DATA COLLECTION

FIELD OF THE INVENTION

The present invention relates to data collection, and more specifically, to networked data collection using non-experts.

BACKGROUND

Machine learning is the ability of a machine to improve its performance based on experience, rather than explicit programming. In general, for machine learning, the limiting factor is providing data to the machine. In many cases, systems are trained by individuals. For example, researchers train a system by adding data to the system. However, this is extremely time consuming, and requires a researcher.

Traditional open source and e-community based systems attempt to use the large number of programmers that willingly contribute to open source projects, such as Linux. These open source projects are generally designed to create software for which source code is freely available. However, because open source is a method of creating software, most of the persons who are now connected to the Internet do not participate in the open source community. Most individuals can not contribute, since contribution requires technical knowledge and a significant time contribution to generate a software product. Open source software is similar to a quilt, with each individual providing a square, which then together forms a single quilt. However, open source ignores a majority of the on-line community, and has not been logically extended beyond software.

SUMMARY OF THE INVENTION

A method and apparatus for data collection is described. The method comprises setting up a system for learning. The method further comprises presenting queries to non-expert netizens over a network, and based on responses to the queries, continually updating the system and refining the queries. The non-expert netizens thereby participating in the training process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of one embodiment of the database layout for the Learning System.

FIG. 9B is an illustration of another embodiment of a process for learning for handwriting recognition.

DETAILED DESCRIPTION

Figure 1:
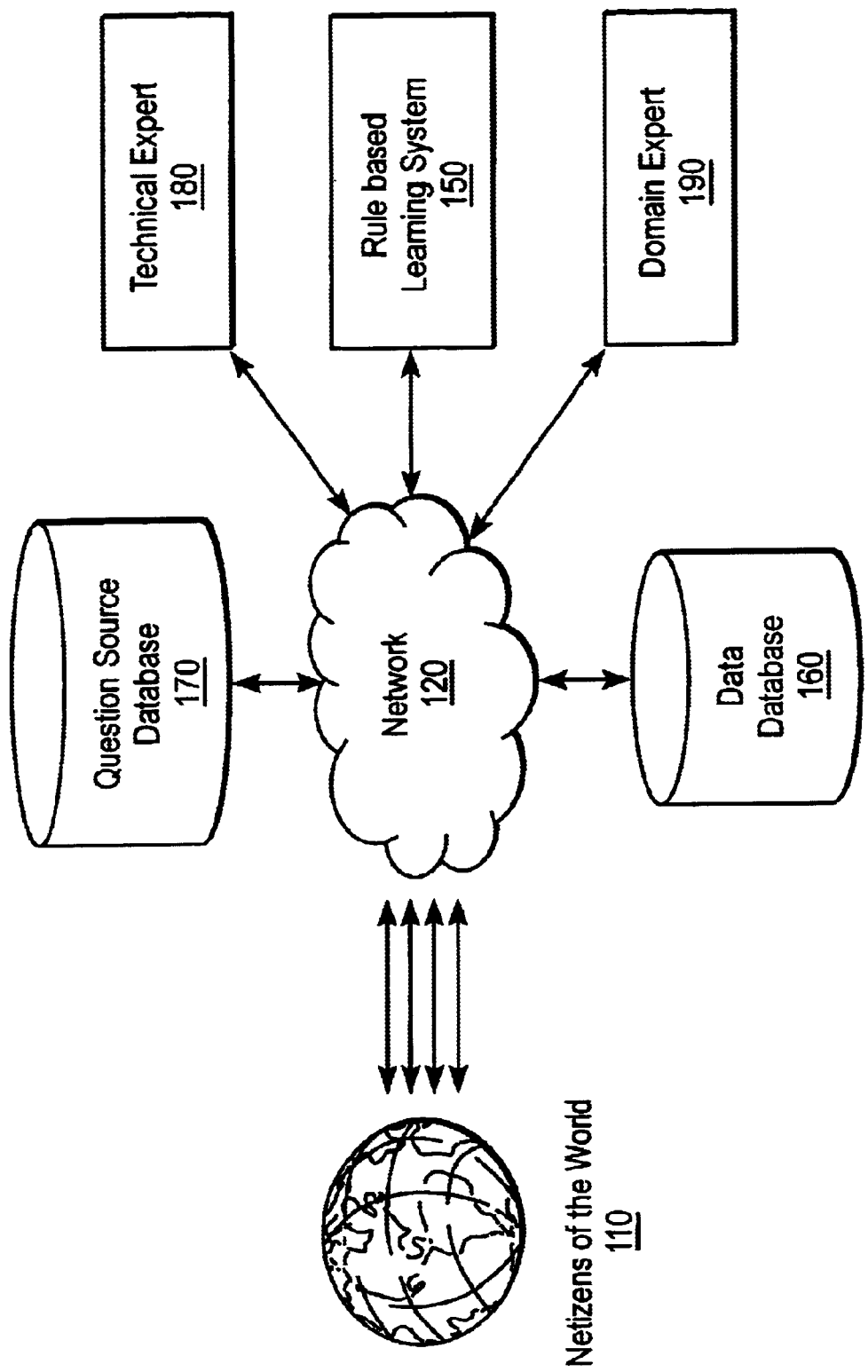
FIG. 1 is a block diagram of one embodiment of a network.

A method and apparatus for data acquisition is described. The data acquisition system is an internet based collaborative framework for constructing intelligent systems. Non-expert Internet participants, netizens, contribute informal data by the responding to interactive queries presented to them. This data is then collected, and used to train classifiers or guide automatic inferencing systems. For one embodiment, the data acquisition system further uses experts to accept data of high quality and consistency and reject data of low quality.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a network. The netizens of the world 110 interact with network 120. For one embodiment, the netizens 110 may use the network to access various systems. The netizens 110 may further use the network 120 to access rule based learning system 150.

For one embodiment, the rule based learning system 150 further may receive input from technical experts 180 and domain experts 190. Technical experts 180 may be helpful in configuring the rule based learning system 150, such that it implements the rules appropriately. Domain experts 190 may be used to resolve conflicts between netizens 110. This will be described in more detail below. For one embodiment, the technical experts 180 and domain experts 190 may be connect the rule based learning system 150 via network 120. Alternatively, either technical experts 180 or domain experts 190, or both, may connect to the rule based learning system 150 directly, without using network 120.

Rule based learning system 150 may utilize a question source database 170, which includes the raw data to formulate queries for the netizens 110. For one embodiment, the question source database 170 may be a remote database accessed through network 120. For another embodiment, question source database 170 may be directly coupled to rule based learning system 150, or part of the rule based learning system 150. For one embodiment, question source database 170 may be a distributed database.

For one embodiment, rule based learning system 150 further includes data database 160. Data database 160 stores the results of the queries by the rule based learning system 150. The data database 160 may be a distributed database, may be coupled to rule based learning system 150 via network 120, or directly.

For one embodiment, the rule based learning system 150 may be collecting open data, e.g. data that is made available over the network. Access may be provided to the data in data database 160. This may be advantageous to provide an incentive to netizens 110 to participate in the process. Furthermore, by using netizens 110 instead of domain experts to provide data to the system, the open data acquisition system expands the idea of the Open Source community to data acquisition and to non-expert netizens 110.

Figure 2:
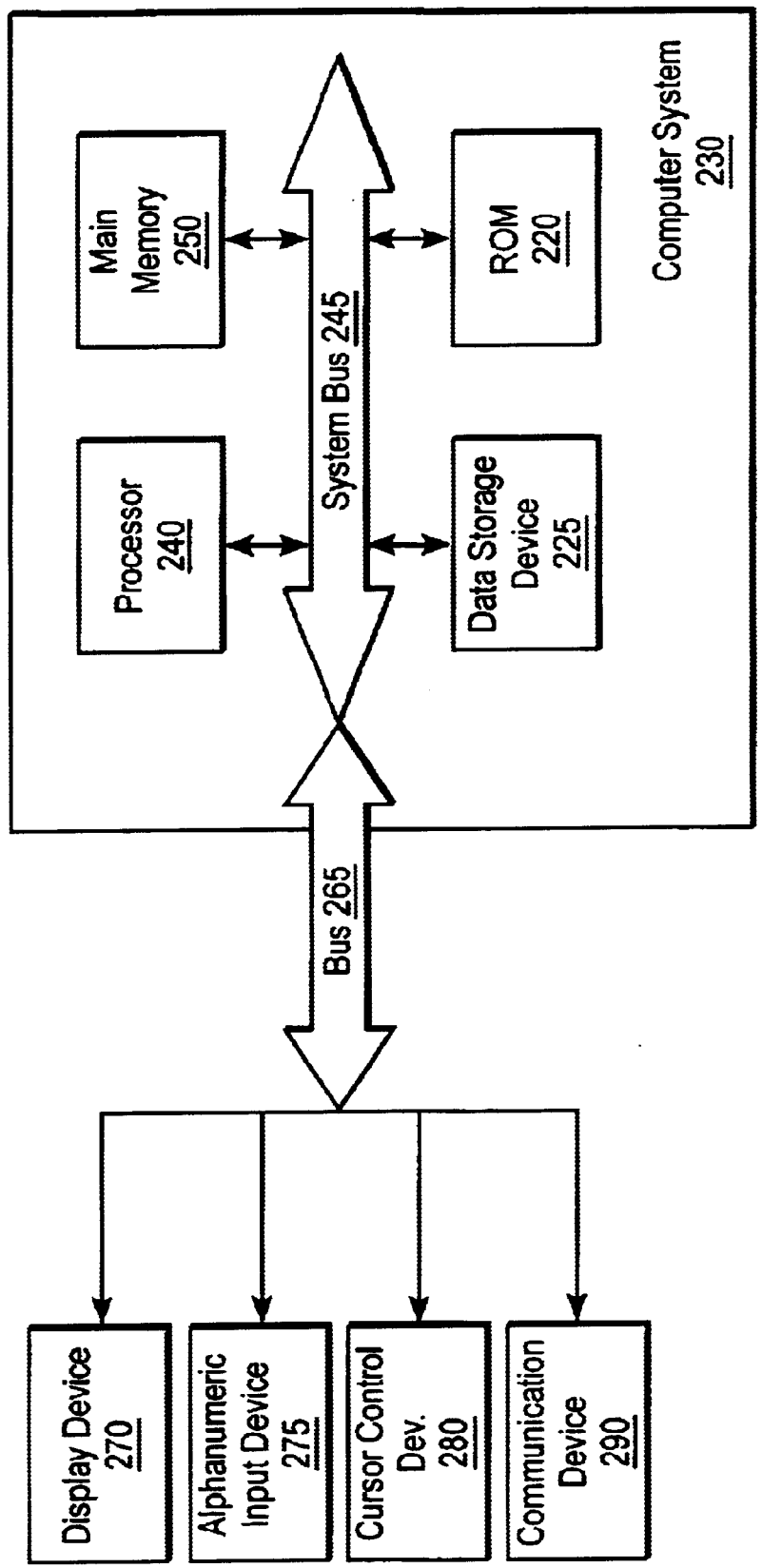
FIG. 2 is a block diagram of one embodiment of a computer system.

FIG. 2 is a block diagram of one embodiment of a computer system. It will be apparent to those of ordinary skill in the art, however that other alternative systems of various system architectures may also be used.

The system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 240 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270. Another device that may optionally be coupled to bus 245 thorough bus 265 is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives. It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
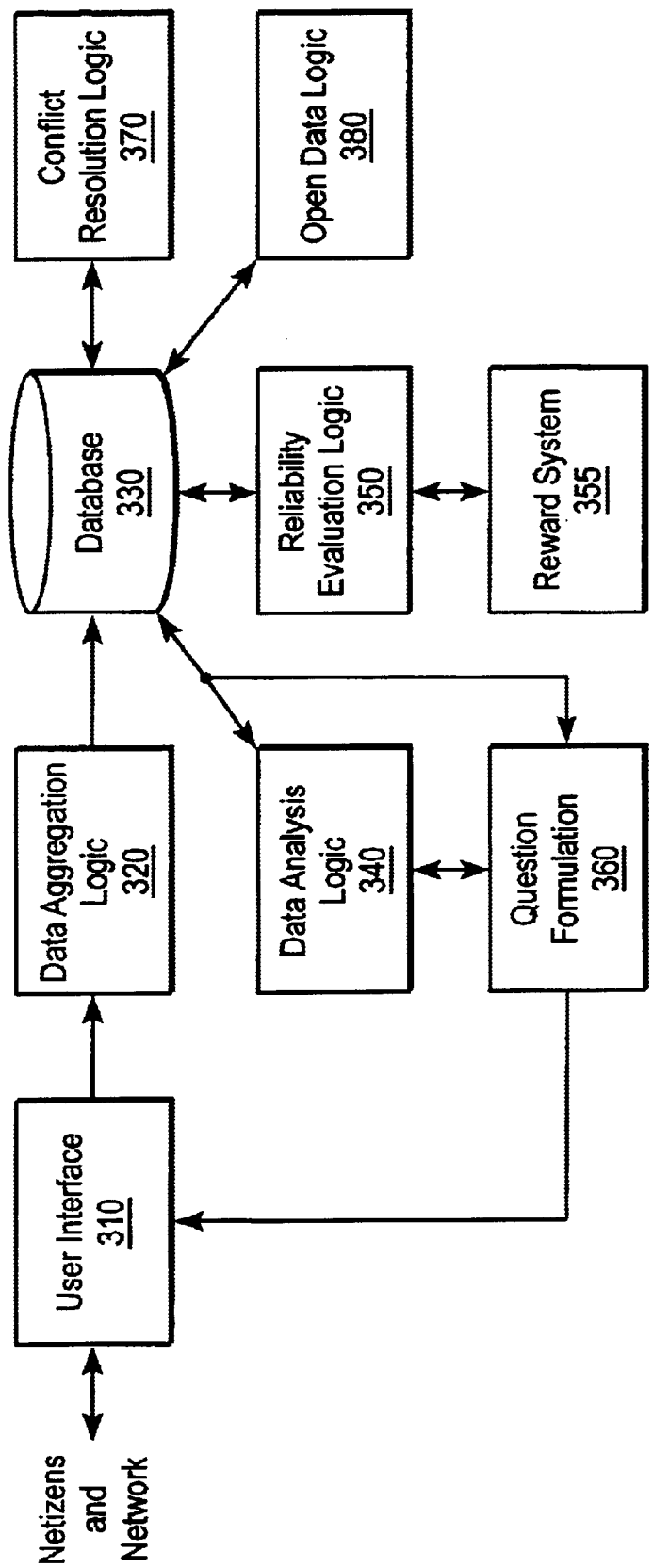
FIG. 3 is a block diagram of one embodiment of the Learning System.

FIG. 3 is a block diagram of one embodiment of the Learning System. For simplicity the learning system 300 is illustrated as including a single database 330, which includes the questions and the answers received. As discussed above with respect to FIG. 1, database 330 may comprise multiple databases distributed via network 120.

Learning system 300 includes a user interface 310. User interface 310 presents queries to netizens via a network (not shown) and receives the responses from the netizens. Furthermore, for one embodiment, user interface 310 is used by domain experts and technical experts to interact with the learning system 300.

Queries are presented to netizens via user interface 310. The responses are passed by the user interface 310 to data aggregation logic 320. Data aggregation logic 320 passes the data to database 330. Data analysis logic 340 receives the data from database 330. The data received by data analysis logic 340 comprises the responses from various netizens to a set of queries. These responses are analyzed by data analysis logic 340, in order to formulate further queries, and to determine whether the current learning objective has been satisfied. Question formulation logic 360 receives the results from data analysis logic 340, and further has access to database 330, to receive raw data for formulating the next query. Question formulation logic 360 formulates a query, and passes that query to user interface 310 for the next netizens(s).

Conflict resolution logic 370 is further coupled to database 330. Conflict resolution logic 370 monitors data in database 330. For one embodiment, for certain types of queries, if two data points are expressly in conflict, as will be described below, conflict resolution logic 370 resolves to the conflict. For one embodiment, the conflict resolution logic 370 locks off the portions of the data that are in conflict and requests that a domain expert resolve the conflict. Thus, for example, in the instance when an image is identified by netizens as both a mammal and a reptile, the conflict resolution logic 370 may lock the queries associated with this branch until a domain expert can resolve the question.

Reliability evaluation logic 350 may further be coupled to database 330. Reliability evaluation logic 350 determines a reliability rating for the netizens participating in the learning process. For one embodiment, when a number of responses to a query define a "correct" answer, the responses of the netizens who responded to the query are evaluated. The reliability evaluation logic 350 determines the reliability of each netizens' responses. For one embodiment, the tracking of each netizen occurs in the database. For one embodiment, each netizen is tracked anonymously, e.g. without personal identification. Thus, for example, a netizen may log into the system with a pseudonym, and there is no attempt to associate the pseudonym with actual identity. In this case, although reliability is tracked, the individuals who contribute to the learning system 300 do not lose their privacy. This reliability rating is used subsequently to figure out the "correct" answer to subsequent questions. For one embodiment, the reliability rating may vary between 1 and −1, where 1 corresponds to a 100% reliability and −1 corresponds to a 0% reliability.

For one embodiment, a reward system 355 is coupled to reliability evaluation logic 350. Reward system 355 provides a form of reward to netizens for their participation in the learning process. For one embodiment, the reward system 355 may provide one or more of the following: recognition such as posting names of participants, for one embodiment in order of reliability; lottery for certain rewards; money; frequent flyer miles; or other rewards. In general, the incentives need not be monetary. For one embodiment, the reward system 355 may be eliminated. Generally, netizens participate out of general interest, receiving benefits from having the learning system available (e.g. if the learning system is a speech recognition system, the netizens may be looking forward to using the system when it is functional), altruism/philanthropy, education (e.g. if the learning system is learning about animal classification, the netizen may learn new information by using the system.) Other rewards may be in the format of the learning system, e.g. the learning system is set up as a game, such as a multi-user dungeon (MUDD), Marathon, simulation game, etc. This may provide its own incentives. Alternative methods of providing rewards may be used.

An open data logic 380 may further be coupled to the database 330. The open data logic 380 may make the data in the database available to third parties. Thus, for example, those portions of the data that have been determined to be valid/useful to a certain percentage certainty, may be provided to the world. The open data logic 380 may, for one embodiment, remove identifying data, such as identity of the contributor of the data. Alternatively, the open data logic 380 may provide full access to the data in the database 330.

For one embodiment, the learning system 300 described above is one of a plurality of learning systems that are coupled to the network. These learning systems 300 may exchange data via the network. For example, a learning system to learn handwriting recognition may have separate systems in different countries, and use the correspondence and differential data to derive further country-specific information. In this way, the learning system 300 enables a plurality of netizens to participate in providing data to the system.

FIG. 4 is a block diagram of one embodiment of the database layout for the Learning System. The database layout 400 includes a plurality of questions 410, each question having a plurality of responses 420. For one embodiment, questions are sequentially asked. Thus, for example, for the first "m" netizens, the same question is posed. When a sufficient number of responses have been received for the question, the next question is asked of the next "n" netizens. For one embodiment, the number of times the same question is asked depends on the confidence rating 470 in the aggregate response X. Each response 420 has associated with it a responder 430, and a rating 440. The responder 430 identifies the individual who provided the particular response 420. For one embodiment, the responder identification 430 is pseudonymous, e.g. no actual identity is disclosed. The rating 440 identifies the current reliability rating of the responder 430. For one embodiment, the rating 440 may vary between 1 and −1. For one embodiment, the reliability rating of the responder 430 is updated continuously, as more data is received from the responder and from others.

For one embodiment, an aggregate response 450 is also maintained for the question 410. The aggregate response identifies each of the responses provided, and the number of responders 460 who provided each of the responses, and a confidence rating 470, for each of the responses. For one embodiment, the aggregate confidence rating 470 adds up to 100%. Thus, for example, for a handwriting recognition, for a character such as "ι", 0.24 of responders identified the character as a capital I, while 0.65 responders identified the character as a small l, and 0.01 of the responders identified the character as a capital J. When the confidence rating is above a certain threshold (for example 70%) or the number of responders is above a certain threshold (for example 100), the question is closed, and the next question is determined and presented. As discussed above, for one embodiment, subsequent questions depend on the responses to previous questions. Thus, for one embodiment, question n may not be defined, when the current responders are responding to question 2.

It is to be understood that FIG. 4 merely illustrates one exemplary database layout. Alternative organizations of the database may be used.

Figure 5:
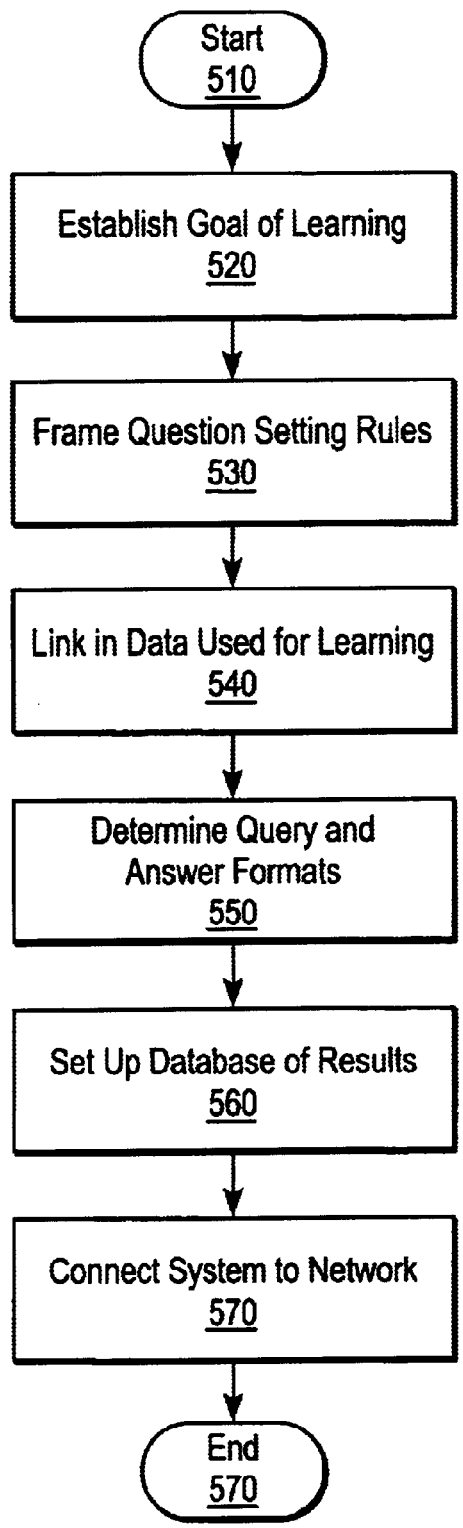
FIG. 5 is a flowchart of one embodiment of a process for performing system setup.

FIG. 5 is a flowchart of one embodiment of the system setup. The process starts at block 510, when the system is initially set up. At block 520, a goal of the training is set up. For example, for a handwriting recognition system, the goal may be to be able to translate a number of samples without errors. For another example, for a animal identification program—described below—the goal may be to have one-hundred uniquely identified animals. Alternative types of goals may include a number of responses being received and processed, a period of time, an ability to pass a certain test, etc.

At block 530, the question setting rules are framed. Generally, the system provides questions to netizens. These questions are framed in light of previous answers to previous questions and the goal defined for this system. For example, for one embodiment, the questions are selected from a database of questions available to the system. For one embodiment, in that case, a question may be selected until a certain number of identical responses are received. At that point, the next sequential question may be presented. For example, a first question may be presented until at least 50 responses have been received with 90% of the responses being identical. Another embodiment of formulating questions is described below with respect to FIG. 7.

At block 540, a link is established with the data used to formulate the questions. For example, for a handwriting recognition system, a database of handwriting samples is identified. For one embodiment, the link from the database to the learning system is established. For another embodiment, the database may be within the learning system itself.

At block 550, the query and answer formats are determined. Generally, the questions are formatted to minimize the type of responses the user can provide. For example, for handwriting recognition, the system may accept only a certain set of letters. For another embodiment, the responses may be formatted as multiple choice or true/false responses. For one embodiment, various questions may be presented in different forms.

At block 560, a database is set up for the results. For one embodiment, this step may not be needed, if the database used to formulate questions is used for results as well. For another embodiment, this step may be skipped.

At block 570, the learning system is coupled to the network, or made available to the netizens who wish to participate in another way. The system is now completed and may be used to learn and to accumulate data. The process then terminates at 580.

Figure 6:
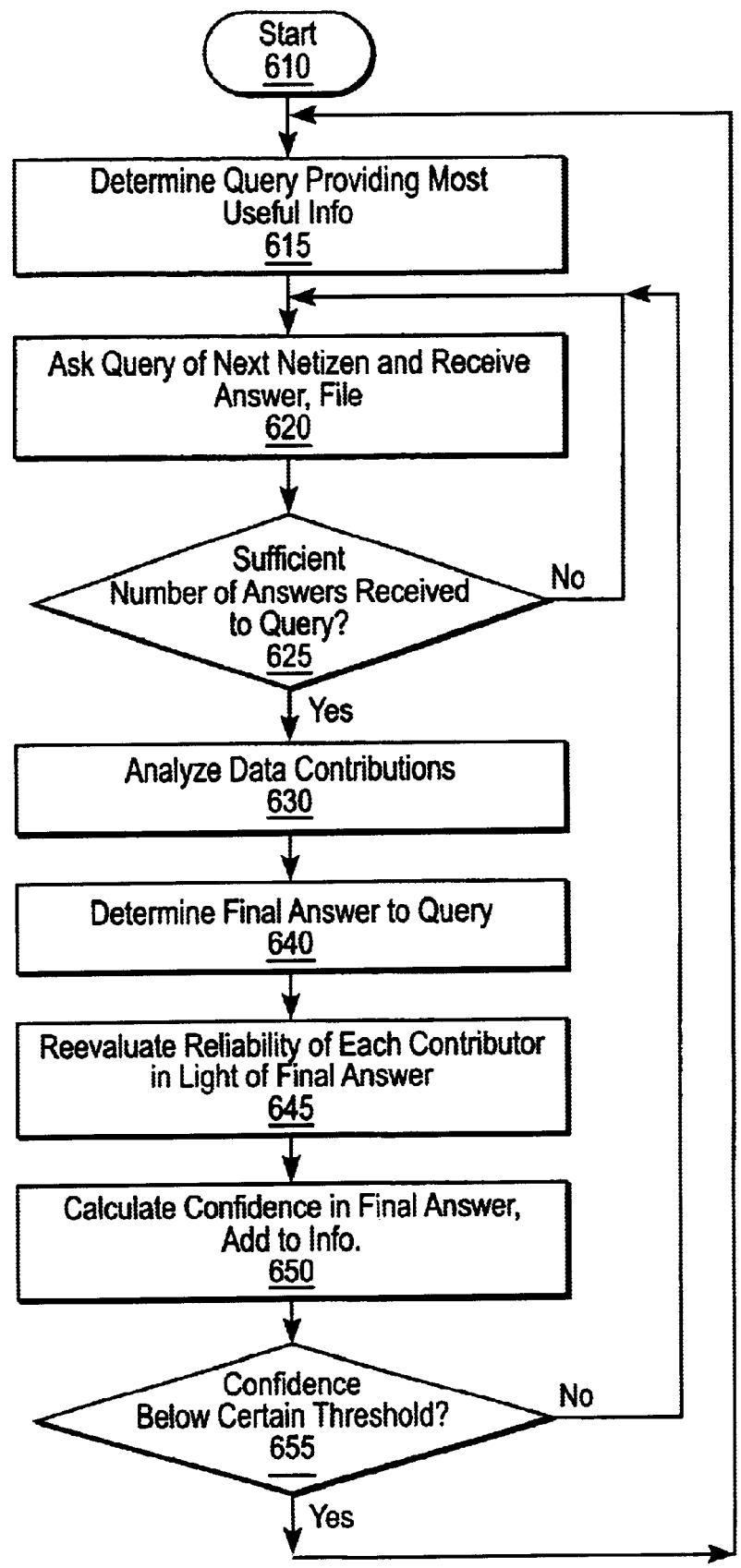
FIG. 6 is a flowchart of one embodiment of a process illustrating system use.

FIG. 6 is a flowchart of one embodiment of system use. The process starts at block 610.

At block 615, the process determines what query would provide the most useful information. This is described in more detail with respect to FIG. 7. Formulating the query includes generating a question and generating a format for a reply.

At block 620, the query is provided to the next netizen who wishes to participate in the learning system. A response is received from the netizen. Generally, this occurs by the netizen logging on to a web page maintained with the learning system. The netizen can indicate that he or she wishes to participate in the learning process. The question is then presented. For one embodiment, the question may be presented in various formats, including HTML, Java, JavaScript, RealAudio, video, or other formats. The response is generally indicated by keystroke(s). For one embodiment, a user may provide a response using a microphone, transmitting a voice response to the system. This response is then placed in the database of responses. As described above, the response may include the identity of the netizen providing the answer, as well as a reliability rating for the netizen.

At block 625, the process determines whether sufficient number of responses have been received to the query. For one embodiment, one response may be considered a sufficient number of responses. For another embodiment, a preset number of responses are collected, prior to analysis. If there have not been a sufficient number of response, the process returns to block 620, to present the same query to the next netizen who participates in the process. For one embodiment, if the same netizen wishes to continue participating, a different question is presented to the netizen. For one embodiment, since the identity of the netizen is known, the system prevents duplicate questions to the same netizen.

At block 630, the data contributions, e.g. responses to the query, are analyzed in light of previous responses, and the goals of the system.

At block 640, the final answer to the query is determined. For one embodiment, if the system is set up to learn handwriting recognition, the test is whether the system recognizes all formats of the response.

At block 645, the reliability of each contributor is evaluated in light of the final answer. Depending on the final answer, the contribution may be "true" or "false", in other words, the system determines whether the particular netizen's contribution agrees with the final answer.

At block 650, the confidence in the final answer is calculated. Based on the netizens' contributions, and on the total number of responses, the system determines a confidence. For one embodiment, the confidence value may be as follows:

$$C = \frac{\sum_{T=0}^{t}(N_T * R_T)}{\sum_{T=0}^{t}(N_T * R_T) + \sum_{F=0}^{f}(N_f * R_f)}$$

where
C is the confidence level;
N is a netizen;
R is a reliability of that netizen;
T is the responders who answered correctly; and
F is there responders who answered incorrectly.
This confidence rating is further added to the information about the answer for the query.

At block 655, the process determines whether the confidence rating of the answer is sufficiently high to accept that answer. For one embodiment, a confidence rating may be set to a value, such as 80% confidence (e.g. $C \geq 0.8$). For one embodiment, the minimum level of confidence needed may depend on the application. For certain applications, a high level of confidence is very important. For other applications, the quantity of data is more important than the quality. The minimum confidence rating may be altered to reflect these values.

If the confidence rating of the answer is below the threshold, the process returns to block 620. Otherwise, the process loops back to the beginning, to block 615, to formulate the next query. For one embodiment, this system may run indefinitely, until no more questions remain, or until the learning process is terminated. For one embodiment, since a query providing the most useful information is generated at block 615, the process continues to learn progressively. Thus, no termination is necessary for this process.

Figure 7A:
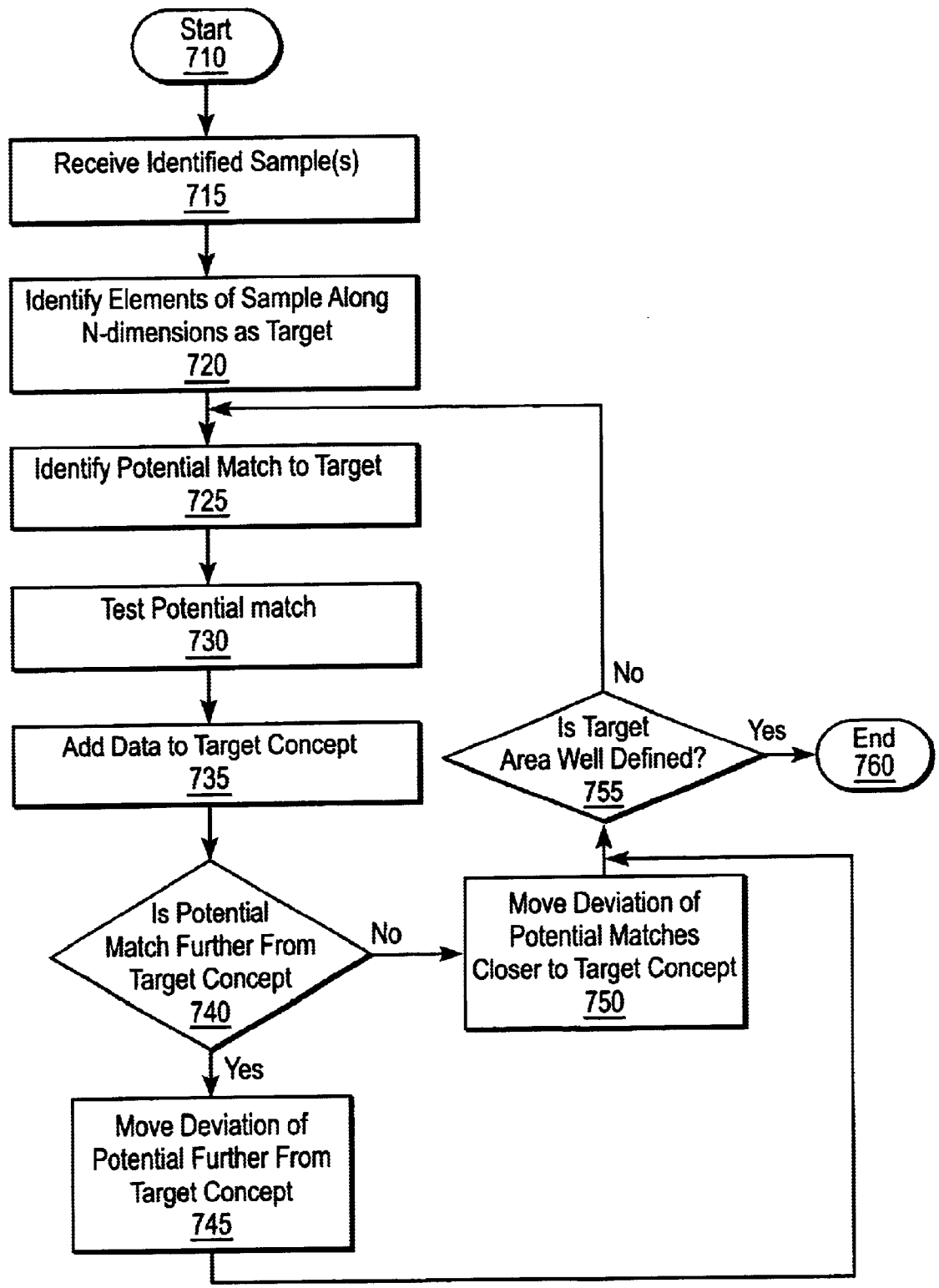
FIG. 7A is a flowchart of one embodiment of a process for performing question selection and learning.

FIG. 7A is a flowchart of one embodiment of question selection/learning. The process starts at block 710. One or more identified samples are received at block 715. For one embodiment, these identified samples may be identified by domain experts. For example, for handwriting recognition, the samples may be sample handwritten letters. (e.g. a handwritten alphabet). For an animals game, for example, the root animal and its identification may be the sample received.

Figure 7B:
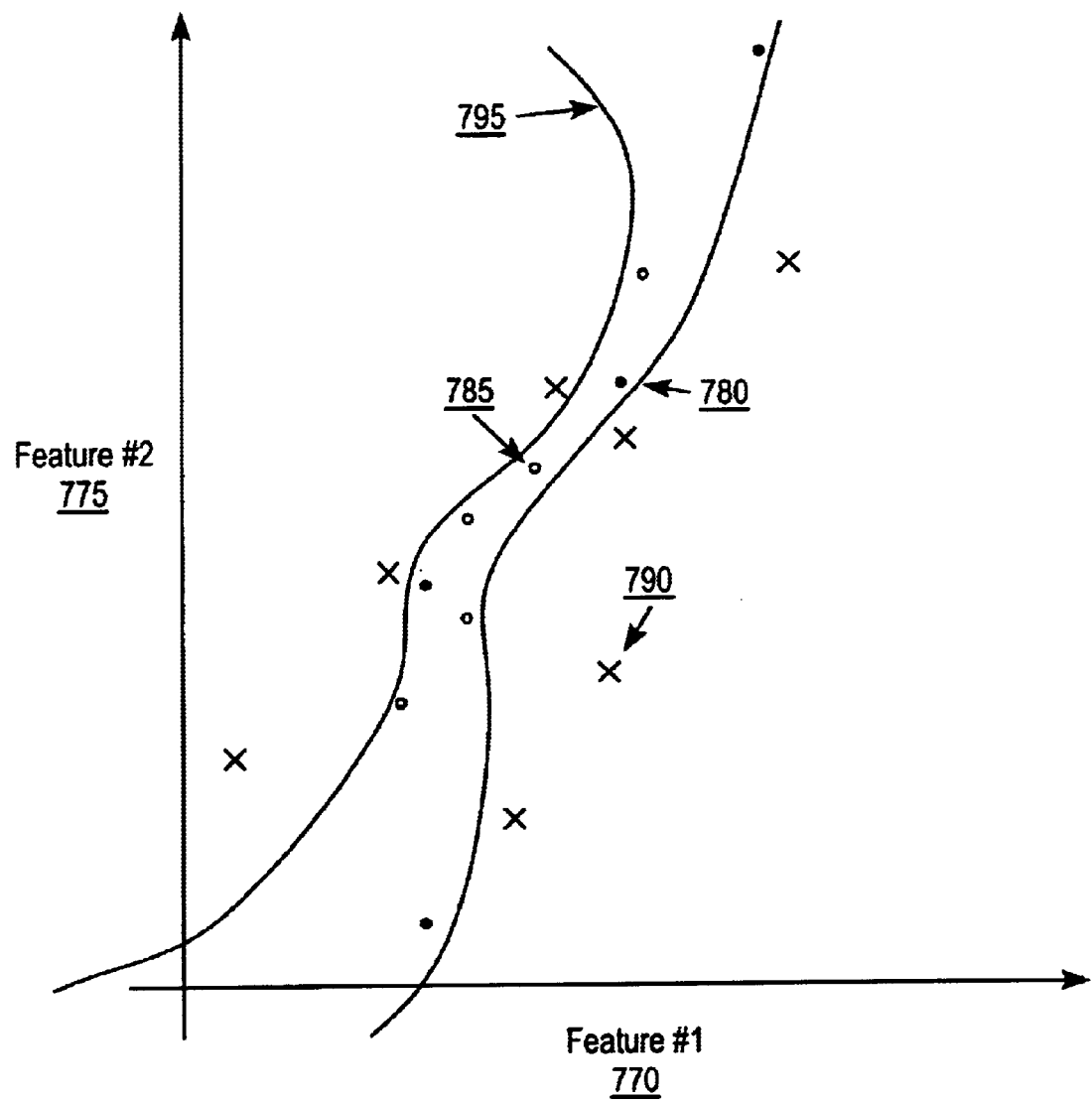
FIG. 7B is a diagram of a two-dimensional target definition.

At block 720, elements of the sample are identified along N-dimensions as the target. For one embodiment, multiple targets may be present. For example, for handwriting recognition, one target may correspond to each letter in the alphabet. For speech recognition, each phoneme may have its own target. FIG. 7B is a diagram of a two-dimensional target definition.

Feature #1 770 is shown along a first axis, while Feature #2 775, is shown along a second axis. Target points 780, 785, 790 define a target envelope 795. For one embodiment, samples provided at setup are indicated as dark target points 780. Other affirmatively identified items are target points 785, while negatively identified target points 790 are outside target envelope 795. This can be extended along multiple dimensions. This is merely an illustration of the relationship of certain features.

Returning to FIG. 7A, at block 725, a potential match to target is identified. For one embodiment, the potential match is identified in an area where it provides the most amount of information. For example, in the illustration of FIG. 7B, the potential match may be identified as being proximate to the edges of envelope 795 in an area that has a fairly large number of data points. Mathematical algorithms for selecting such a location are known in the art.

At block 730, the potential match is tested. This testing is as described above, by asking questions of netizens. For one embodiment, testing may be many cycles, in which multiple questions are asked. For another embodiment, a single response may be sufficient for testing.

At block 735, the data is added to the definition of the target. Thus, for example, each response is added as a target point 785, 790. The target envelope 795 is appropriately adjusted as well to reflect the new responses.

At block 740, the process determines whether the potential match was found to be a match. If the potential match was found to be within envelope 795, the process continues to block 745.

At block 745, the deviation of potential matches is increased. For one embodiment, potential matches are varied from known good samples by a deviation. If the match is found to be within the target envelope 795, the deviation is increased.

Alternatively, if the potential match was found to be outside the target envelope 795, the deviation is decreased. The process continues in either case to block 755.

At block 755, the process determines whether the target envelope is defined. For one embodiment, the target envelope has areas which are well defined, and areas which are not well defined. For one embodiment, there are no areas within the deviation that are not yet defined, the process continues to block 760, and terminates. Otherwise, the process returns to block 725, to identify a new potential match.

Figure 8A:
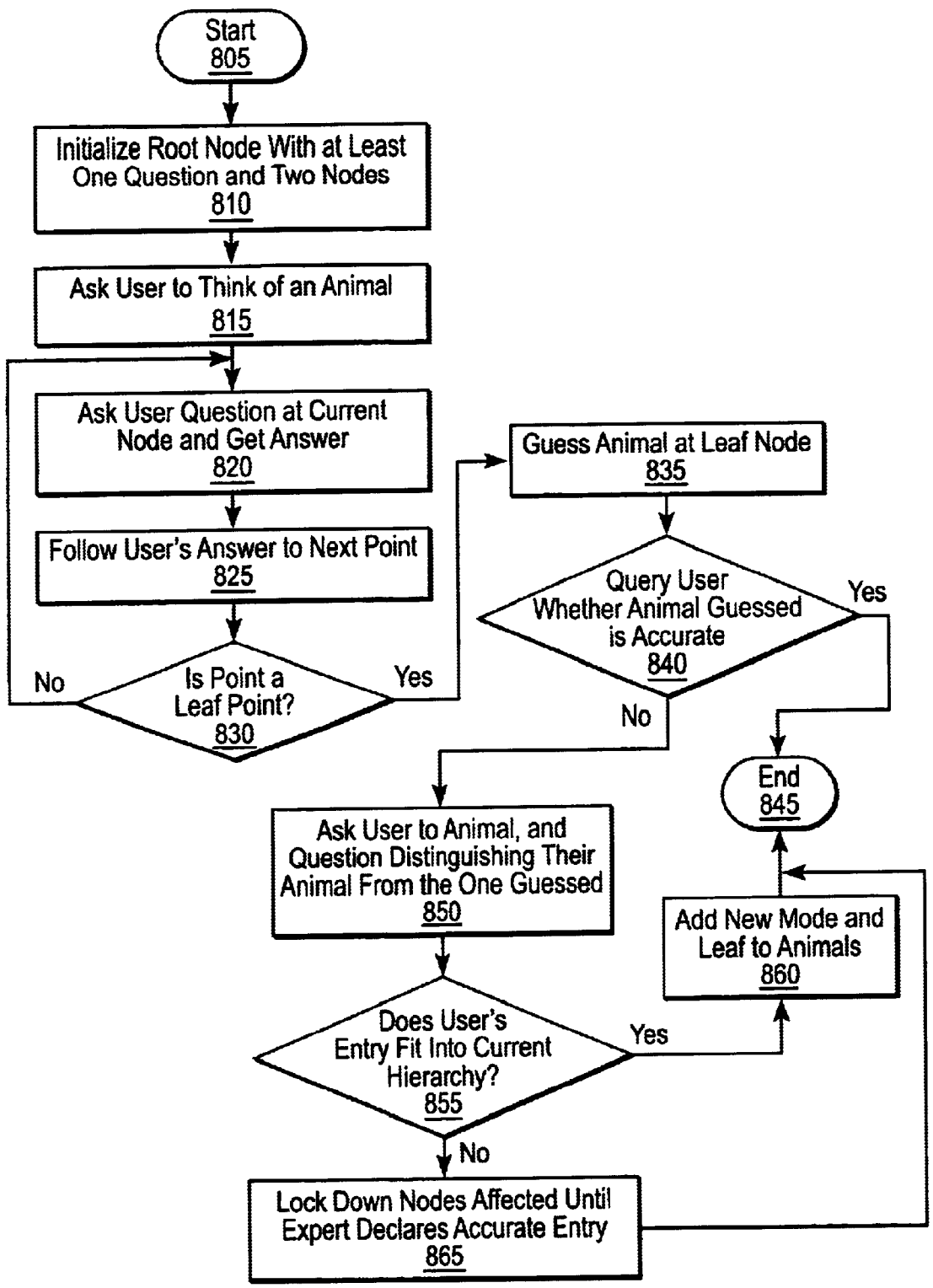
FIG. 8A is a flowchart of one embodiment of a process for learning using the Animals learning system.

FIG. 8A is a flowchart of one embodiment of learning using the Animals learning system. The process starts at block 805.

Figure 8B:
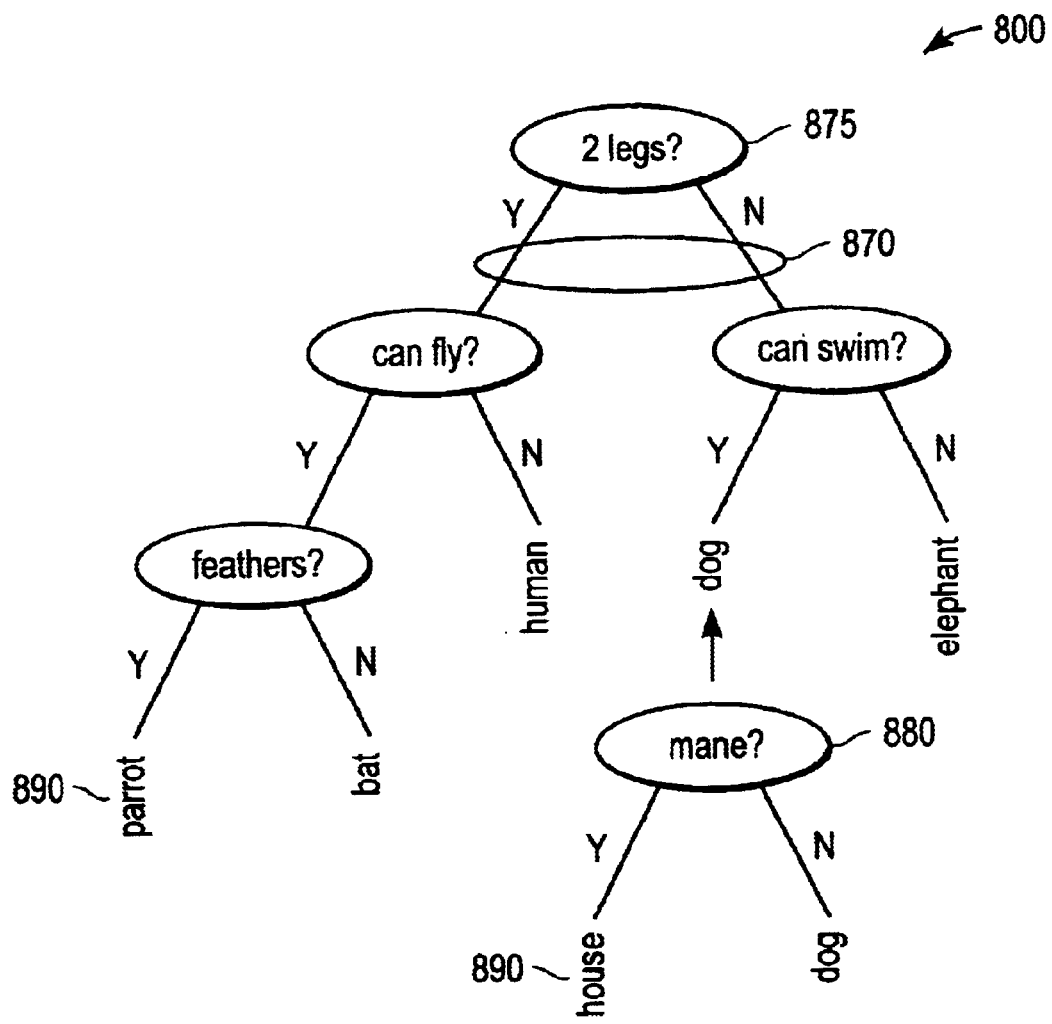
FIG. 8B is an illustration of one embodiment of a process for learning using the Animals learning system.

At bock 810, a root node is initialized, with at least one question, and two leaf nodes. FIG. 8B illustrates one embodiment of an animals structure. The root node 875 includes two possible answers, yes and no. From each of these nodes, there are follow-up questions. The leaf nodes 880 include guesses of the identity of the animal in question.

Returning to FIG. 8A, at block 815, the user is prompted to think of an animal. For this example, the user may have thought of a horse.

At block 820, the current question is presented to the user and an answer is received. In the example of FIG. 8B, if the user had just started the process, the question would be "is the animal two-legged," the question of the root node 875. The user may answer Yes or No, depending on whether the animal the user is thinking of has two legs or not. For the above example, the user would select No, since horses are not two-legged.

Returning to FIG. 8A, at block 825, the user's answer is followed to the next point. In this instance, the next question presented would be "does the animal swim."

At block 830, the process determines whether the answer leads to a leaf node. Leaf nodes are points at which there are no further questions. If the answer does not lead to a leaf node, as in this instance, the process returns to block 820, and the current question is presented to the user. In the example above, the current question is "does the animal swim." In the example above, after the user answers the question "does the animal swim," the process arrives at a leaf node.

If, at block 830, the answer lead to a leaf node, the process continues to block 835.

At block 835, the system attempts to guess the animal at the leaf node. In the example above, the guess would be "dog" since the user answered that the animal in question does not swim.

At block 840, the user is queried whether the animal guessed is the animal the user thought of. If the user answers in the affirmative, the process terminates. For one embodiment, the database is updated to show the user's progress through the hierarchy. For one embodiment, any reward system is also updated to reflect the user's participation in the process.

If the guess was not accurate, at block 850, the user is asked to identify the animal the user thought of, and enter a question to distinguish the animal from the current leaf-node animal. In the example provided above, since the user was thinking "horse" and the answer was "dog", the user may enter the distinguishing question "does the animal have a mane."

At block 855, the system determines whether the user's animal entry fits into the current hierarchy. For one embodiment, this may be a multi-step query. In general, the system attempts to prevent false responses from being entered into the system. For one embodiment, the system determines whether the same animal exists at another node in the tree. If the animal exists at another node, the user's entry is determined not to fit into the hierarchy. For one embodiment, the user's entry is further compared against a dictionary of names, to determine spelling. If the spelling is incorrect, the user is queried, and if the user insists, the user's entry is determined not to fit into the hierarchy.

If the user's entry fits into the hierarchy, the process continues to block 860, and the new node and leaf are added to the tree. As shown in the example of FIG. 8B, the previous leaf node is replaced by a new node including the query the user submitted, and the previous leaf node is presented as one of the two leaf nodes off the new node. Thus, new node 880 includes the query "does the animal have a mane." As is shown, the leaves are "dog", the previous guess, and "horse," the animal the user thought of. The process then ends at block 845.

If at block 855, it is found that the user's entry does not fit into the current hierarchy, the process continues to block 865.

At block 865, the nodes affected are locked down until an expert declares which answer is accurate. Thus, for example, in the example of FIG. 8B, if the user had proposed the question "is it hairless" and the answer provided would be "human." Since the answer "human" already exists on another node, both nodes are locked down until this conflict is resolved. The process the ends at block 845.

Figure 9A:
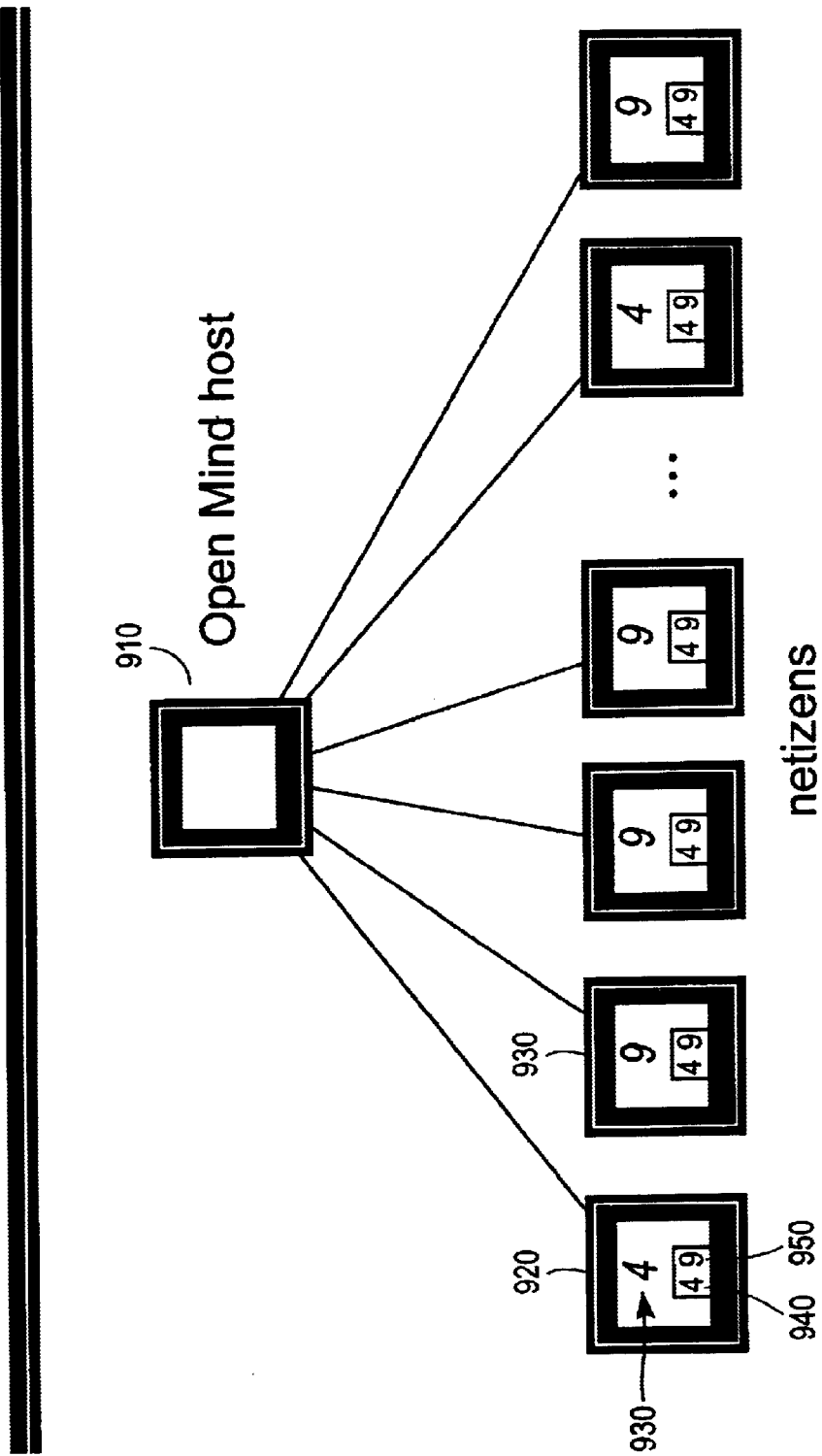
FIG. 9A is an illustration of one embodiment of a process for learning for handwriting recognition.

FIG. 9A is an illustration of one embodiment of learning for handwriting recognition. A character 930 is presented to the user, and the user is prompted to select one of two options 940. For another embodiment, instead of a single character, the query presented to the user may be a word, a sentence, or another subset of handwritten data. An example of the various formats of the character 930 is shown.

Figure 9B:
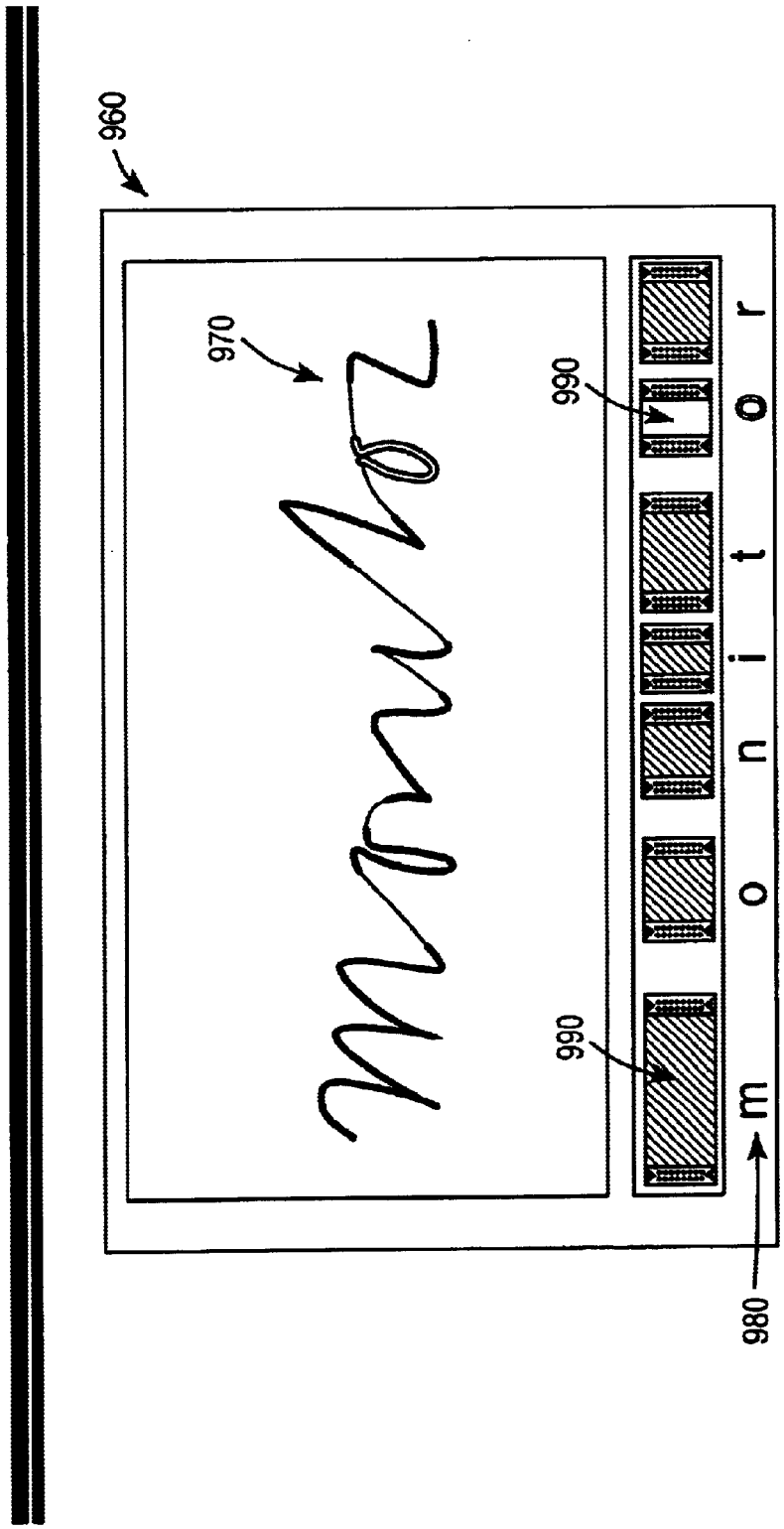
FIG. 9B is a flowchart of one embodiment of a process for the Animals learning system.

FIG. 9B is an illustration of another embodiment of learning for handwriting recognition. A word 970 is presented to the user. The user is then prompted to identicate the letters 980 represented by the word 970. Then, the user is prompted to select the beginning and end of each letter. This is shown by colors 990. This type of presentation provides data about the connection format between letters. Alternative formats of querying a user regarding handwriting recognition may be used.

Figure 10:
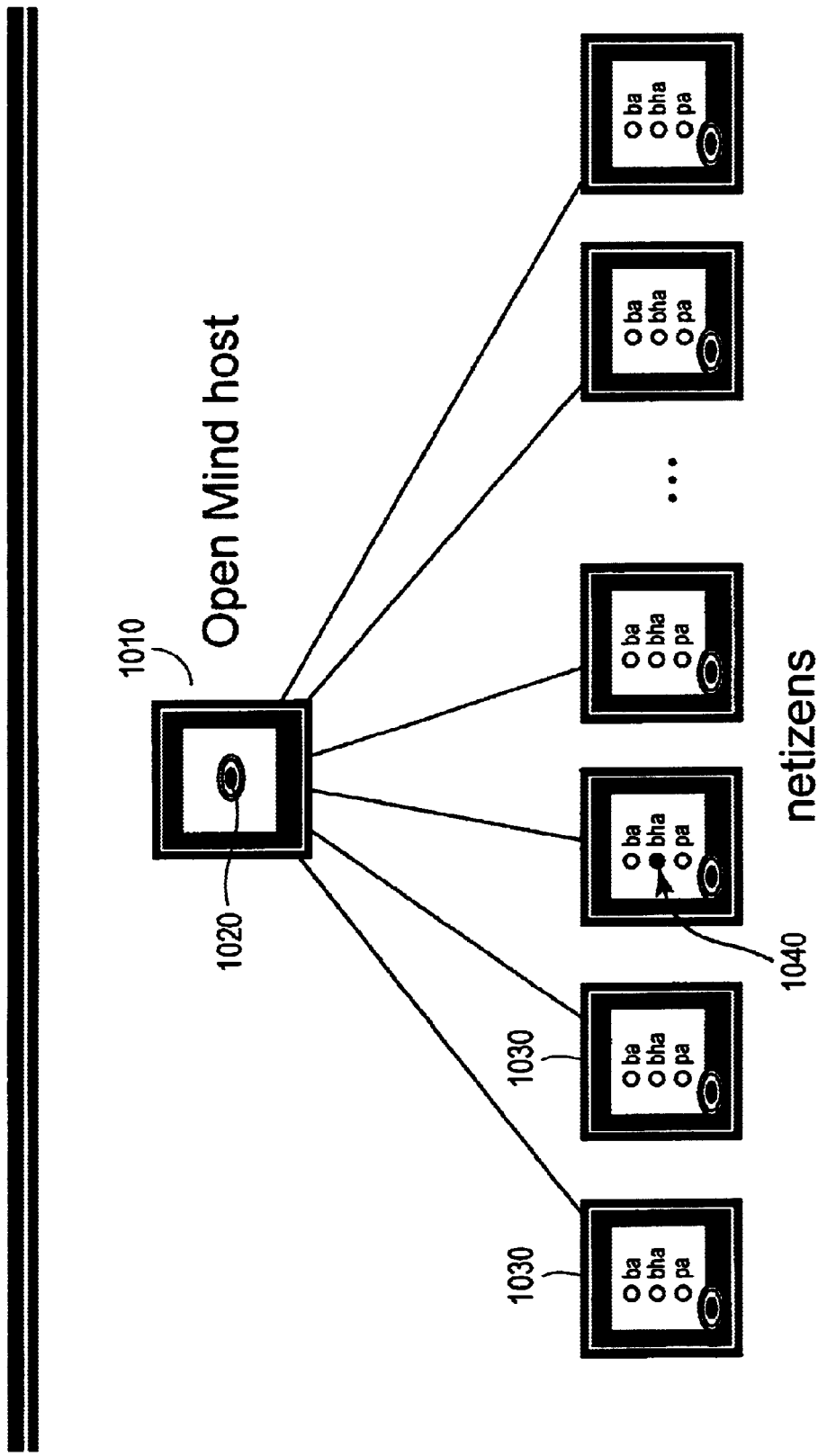
FIG. 10 is an illustration of one embodiment of a process for learning for speech recognition.

FIG. 10 is an illustration of one embodiment of learning for speech recognition. The host 1010 includes a plurality of phonemes. These phonemes are presented to users 1030 via speakers in the user's systems. Each user is then prompted to select an answer 1040 from among the choices. Alternative methods of speech recognition, including presenting an entire word, may be used.

In this way, the numbers of the netizens who are available to contribute are fully utilized. The data collected is useful for machine learning, and to train systems, such as handwriting recognition systems, speech recognition, or other systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of machine learning using a training process to train a learning system, the method comprising:

presenting queries to non-expert netizens over a network, the netizens participating in the training process; and continually updating the system and refining the queries based on responses to the queries provided by the netizens, wherein the queries are multiple choice queries.

2. The method of claim 1, wherein the system has certain goals including accumulating data.

3. The method of claim 2, wherein at least one goal comprises a goal selected from among the following: handwriting recognition, voice recognition, building a database of queries to recognize an object, building a database of common sense.

4. The method of claim 2, wherein the goals of the system evolve as the system is updated.

5. The method of claim 4, wherein the goals comprise a plurality of intermediate goals, that change in response to the responses while approaching a final goal.

6. The method of claim 5, wherein one of the plurality of intermediate goals is to recognize a certain letter of the alphabet in handwriting.

7. The method of claim 5, wherein one of the plurality of intermediate goals is to recognize a sound corresponding to a certain set of letters, in context.

8. The method of claim 1, further comprising providing access to a domain expert to resolve conflicts between the responses of netizens, if a conflict arises.

9. The method of claim 1, wherein setting up the system comprises:

implementing a plurality of rules for presenting questions;

implementing an architecture for interacting with the netizens to enable netizens to access the system; and generating a database for storing the responses.

10. The method of claim 9, further comprising:

evaluating a reliability rating for each of the netizens; and weighting the response of each of the netizens according to the reliability rating.

11. A system coupled to a network to present queries to and receive responses from a plurality of netizens over the network, the system comprising:

a user interface to present the queries and receiving the responses;

a data aggregation logic to organize the responses;

a query formulation logic to formulate a next query based on the plurality of responses to the last query; and reliability evaluation logic to weight each response according to a reliability of the netizen providing the response.

12. The system of claim 11, further comprising:

conflict resolution logic to resolve conflicts between responses provided by the netizens using domain experts.

13. A method of data aggregation over a network comprising:

presenting a question to a plurality of participants over a network;

receiving responses to the question;

analyzing the plurality of responses to the question from the plurality of participants;

formulating a next question based on the plurality of responses; and presenting the next question to the plurality of participants.

14. The method of claim 13, further comprising:

resolving a conflict between the plurality responses provided by the netizens using domain experts, if the conflict arises.

15. The method of claim 13, further comprising:

evaluating a reliability rating for each of the netizens; and weighting the response of each of the netizens according to the reliability rating.

16. A method of interacting with a user comprising:

presenting a query to the user over a network;

receiving a response to the query from the user, the response transmitted to a learning system; and informing the user of a result generated based on the response to the query, such that the user is rewarded by being informed of the content and state of data being gathered based on the response.

17. A machine readable medium having stored thereon data representing sequences of instructions, which when executed by a computer system, cause said computer system to perform the operations of:

presenting multiple choice queries to non-expert netizens over a network, the netizens participating in a training process of a learning system; and continually updating the learning system and refining the multiple choice queries based on responses to the queries provided by the netizens.

18. The machine readable medium of claim 17, wherein the system includes a plurality of goals, and one of the goals is to accumulate data.

19. The machine readable medium of claim 17, further comprising:

rewarding netizens for their participation in the training process.

20. A system for implementing a training process comprising:

a means for presenting queries to and receiving responses from non-expert netizens over a network, the netizens participating in the training process;

a means for continually updating the system and refining the queries based on the responses to the queries provided by the netizens; and a means for rewarding the netizens for participation in training the system.

21. The system for training of claim 20, further comprising:

a means for storing the responses of the netizens; and a means for weighting the responses of each netizens based on a reliability of the netizen.

\* \* \* \* \*